(12) United States Patent
Zhao et al.

(10) Patent No.: US 8,571,814 B2
(45) Date of Patent: *Oct. 29, 2013

(54) LOAD MONITOR RELIABILITY FACTOR USING AN ADVANCED FATIGUE RELIABILITY ASSESSMENT MODEL

(75) Inventors: Jack Z. Zhao, Woodbridge, CT (US); David O. Adams, Stratford, CT (US)

(73) Assignee: Sikorsky Aircraft Corporation, Stratford, CT (US)

(*) Notice: Subject to any disclaimer, the term of this patent is extended or adjusted under 35 U.S.C. 154(b) by 562 days.

This patent is subject to a terminal disclaimer.

(21) Appl. No.: 12/724,730

(22) Filed: Mar. 16, 2010

(65) Prior Publication Data

US 2010/0235109 A1    Sep. 16, 2010

Related U.S. Application Data

(60) Provisional application No. 61/210,229, filed on Mar. 16, 2009, provisional application No. 61/440,017, filed on Sep. 25, 2009.

(51) Int. Cl.
*G01B 3/44* (2006.01)

(52) U.S. Cl.
USPC .......................................... 702/34; 702/41

(58) Field of Classification Search
USPC .................................................. 702/34, 41
See application file for complete search history.

(56) References Cited

U.S. PATENT DOCUMENTS

| | | | |
|---|---|---|---|
| 4,179,940 A | 12/1979 | Oertle et al. | |
| 4,574,266 A | 3/1986 | Valentine | |
| 4,590,804 A | 5/1986 | Brull | |
| 4,707,796 A * | 11/1987 | Calabro et al. | 702/34 |
| 5,163,011 A * | 11/1992 | Gunsallus | 702/42 |
| 5,210,704 A * | 5/1993 | Husseiny | 702/34 |
| 5,393,133 A * | 2/1995 | Fujimoto | 303/119.2 |
| 5,520,055 A | 5/1996 | Fussinger | |
| 6,085,154 A * | 7/2000 | Leuthausser et al. | 702/34 |
| 6,176,136 B1 | 1/2001 | Zoppitelli et al. | |
| 6,226,597 B1 * | 5/2001 | Eastman et al. | 702/34 |
| 6,278,920 B1 * | 8/2001 | Hebberd | 701/29.3 |
| 6,532,421 B2 * | 3/2003 | Miwa | 702/34 |
| 6,571,202 B1 * | 5/2003 | Loman et al. | 703/2 |
| 6,693,548 B2 | 2/2004 | Boyce et al. | |
| 6,768,312 B2 | 7/2004 | Sun et al. | |
| 6,772,074 B2 | 8/2004 | Millott et al. | |
| 6,816,798 B2 * | 11/2004 | Pena-Nieves et al. | 702/84 |

(Continued)

OTHER PUBLICATIONS

Brown, M. et al., Analytical Techniques for Helicopter Component Reliability, Presentation at the American Helicopter Society 64th Annual Forum, Montreal, Canada, Apr. 29-May 1, 2008.*

(Continued)

*Primary Examiner* — Sujoy Kundu
*Assistant Examiner* — Timothy H Hwang
(74) *Attorney, Agent, or Firm* — Carlson, Gaskey & Olds P.C.

(57) ABSTRACT

According to one non-limiting embodiment, a method includes accessing distributions of flight loads associated with one or more flight regimes for a fleet of aircraft. Using the distributions of flight loads, a factor for at least one of the flight regimes is determined that provides a flight load adjustment for a component on each aircraft of a fleet of aircraft known to be affected through at least load damage by the at least one flight regime.

20 Claims, 8 Drawing Sheets

(56) References Cited

U.S. PATENT DOCUMENTS

| | | | |
|---|---|---|---|
| 6,928,881 B2 | 8/2005 | Brennan | |
| 7,149,657 B2 * | 12/2006 | Goebel et al. | 702/183 |
| 7,318,007 B2 | 1/2008 | Barkhoudarian | |
| 7,363,174 B2 * | 4/2008 | Kishiro et al. | 702/54 |
| 8,200,442 B2 * | 6/2012 | Adams et al. | 702/34 |
| 2002/0174384 A1 * | 11/2002 | Graichen et al. | 714/37 |
| 2006/0069520 A1 * | 3/2006 | Gorinevsky et al. | 702/36 |
| 2006/0235707 A1 * | 10/2006 | Goldstein et al. | 705/1 |
| 2007/0260726 A1 * | 11/2007 | Rozak et al. | 709/224 |
| 2008/0021604 A1 * | 1/2008 | Bouvier et al. | 701/30 |
| 2010/0204931 A1 * | 8/2010 | Ling et al. | 702/41 |

OTHER PUBLICATIONS

Thompson et al., A Computational Method for the Determination of Structural Reliability of Helicopter Dynamic Components, AHS Annual Forum, 46th, Washington, DC Proceedings, pp. 859-873, May 21-23, 1990.*

Moon et al., Component Fatigue Life Reliability with Usage Monitor, American Helicopter Society 63rd Annual Forum, Virginia Beach Convention Center, May 1-3, 2007.*

* cited by examiner

LOAD MONITOR RELIABILITY FACTOR USING AN ADVANCED FATIGUE RELIABILITY ASSESSMENT MODEL

RELATED APPLICATION

This application claims priority to U.S. Provisional Application No. 61/210,229 which was filed on Mar. 16, 2009 an also claims priority to U.S. Provisional Application No. 61/440,017 which was filed on Sep. 25, 2009.

BACKGROUND

The present disclosure relates to a Structural Load Monitoring system, and more particularly to a Structural Load Monitoring system incorporating a Load Monitoring Reliability Factor.

Structural health predictions are used to determine when to replace various aircraft components. However, to achieve reliability requirements some of these estimates have been excessively conservative such that aircraft components are being replaced while still having a usable lifespan.

SUMMARY

According to one non-limiting embodiment, a method includes accessing distributions of flight loads associated with one or more flight regimes for a fleet of aircraft. Using the distributions of flight loads, a factor for at least one of the flight regimes is determined that provides a flight load adjustment for a component on each aircraft of a fleet of aircraft known to be affected through at least load damage by the at least one flight regime.

According to one non-limiting embodiment, an apparatus includes a computer configured through computer readable instructions to perform the operations of determining a fatigue reliability of an aircraft component in response to at least one of flight usage data, flight load data, historical data, and a fatigue reliability assessment model. The computer is also configured to perform the operation of determining, using distributions of flight loads, a factor for at least one of the flight regimes that provides a flight load adjustment for the component for each aircraft of a fleet known to be affected through at least load damage by the at least one flight regime.

According to one non-limiting embodiment, a method performed by a computer either on-board or remote from an aircraft includes receiving a flight loads reliability factor associated with a component on an aircraft, multiplying aircraft flight loads by the factor to determine adjusted flight loads, using at least the factor to adjust a lifetime of the component in response to the adjusted flight loads, and displaying the adjusted lifetime of the component.

These and other features can be best understood from the following specification and drawings, the following of which is a brief description.

DETAILED DESCRIPTION

The Conventional Damage Calculation Reliability

One way to evaluate the basic reliability provided by a conventional safe-life damage calculation provided for a structural reliability goal of a component, such as an aircraft component, is the "6-9's" for each component. In the "6-9's" framework, each "9" represents a factor of 10 in reliability. "1-9" indicates 90% reliability and 10% failure. "2-9's" indicates 99% reliability and 1% failure. "3-9's" indicates 99.9% reliability and 0.1% failure. Thus, "6-9's" indicates that no more than 1 component in a million will fail in service prior to its fixed retirement time (99.9999% success and 0.00001% failure). This can only be a calculation goal or estimate because the statistical distribution shapes at the very low probabilities involved cannot be physically verified.

One way to approximate achievement of a "6-9's" goal is to obtain "3-9's" of margin from fatigue strength of a structure; obtain "2-9's" of margin from loads applied to the structure; and obtain "1-9" of margin from usage (i.e. how often the loads are applied to the structure). This corresponds to a "3-sigma" fatigue strength working curve margin ("3-9's"), a "high-envelope" treatment of flight loads ("2-9's"), and a "worst case" assumption on usage. Each provides a contribution to the overall reliability ("1-9").

The conclusion that conventional retirement times have approximately 6-9's reliability applies when the strength, loads, and usage distribution assumptions made for the original substantiation are not violated. However, actual fatigue failures in service are necessarily related to unknowable or unpredictable deviations from these assumptions that may resist the assignment of statistical characterizations in advance. Statistical study of fatigue is valuable, in that such study is the only means to understand and evaluate the relative contributions of each element and attribute of the fatigue substantiation process.

Assumed vs. Actual Flight Load

Figure 1:
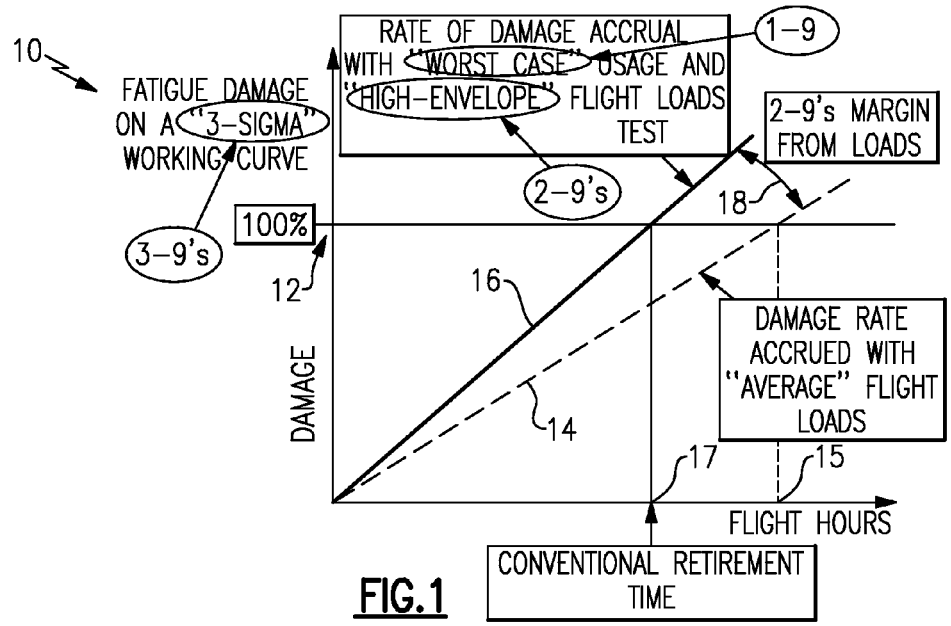
FIG. 1 is a graph that illustrates how cumulative fatigue damage based on a "3-Sigma" working curve varies between a "high-envelope" load damage rate and an assumed average load damage rate.

FIG. 1 is a graph 10 that illustrates how cumulative fatigue damage (see indicator 12) varies between a "high-envelope" flight loads damage rate 16 and a notional average flight loads damage rate 14. At a damage level of 100% (see indicator 12)

a structure (e.g. vehicle part) is assumed to have sustained a maximum amount of acceptable damage, and the part is retired. Thus, indicator 12 refers to cumulative damage indicting 100% "retirement time" of the part being achieved. Line 14 indicates a damage rate accrued with assumed "average" flight loads for a structure, which is an assumed trajectory at which damage would occur, resulting in a 100% damage retirement time occurring at time 15.

Line 16 indicates a rate of damage associated with a "high-envelope" flight loads spectrum used to calculate a fixed retirement time. Using the example of a helicopter, this means that each critical line item in a spectrum maneuver list (i.e., a list of all flight regimes that occur during a flight) contains the highest vibratory load for that specific item that was measured in several replications of the condition in an experimental flight test program conducted for the applicable helicopter model. A flight regime is a predicted maneuver that may be performed during a flight (e.g., 30° turn, landing, etc.). This "high-envelope" loads assumption means that the highest flight test vibratory load for each flight regime is assumed to happen every time that that flight regime occurs in service for the life of the aircraft. This extremely conservative assumption is deliberately imposed in order to add the required safety margin 18 ("2-9's") to the flight loads element of a fixed retirement time calculation. 100% damage is reached at time 17, which results in the margin 18 between the lines 14, 16.

For safety and reliability, a helicopter part is retired according to the "high-envelope" loads assumption at time 17 despite the actual part possibly not having reached 100% damage along the trajectory of average load damage 14. Although this may seem overly conservative, the "high-envelope" assumption protects against failure when only one or two line items in the spectrum dominate the component's damage calculation, and enables one to achieve a 6-9's reliability goal by introducing the margin 18. Outside of the "high-envelope" assumption, actual load damage data has not been used to predict structural lifetimes.

Figure 2:
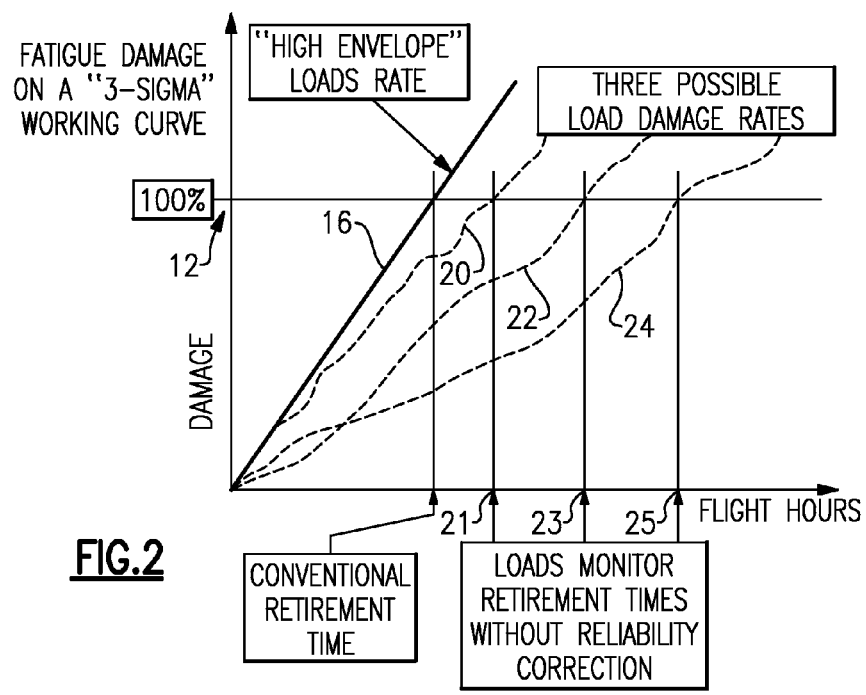
FIG. 2 is a graph that illustrates how monitored load damage counts can be directly substituted for a "high-envelope" load damage to prolong a retirement time for a component.

FIG. 2 illustrates how actual load damage rates 20, 22, 24 can be directly substituted for the "high-envelope" load damage rate to prolong a retirement time for a part. However, simply using actual load damage profiles 20-24 eliminates the margin 18 that provides two of the 9's of the 6-9's. Although one could argue that having actual measured flight loads removes a major unknown from the life calculation, a statistical analysis will demonstrate that a direct load damage monitor retirement time has only the approximately 4-9's of structural reliability provided by the strength and usage margins.

Adding Back the 2-9's

Figure 3:
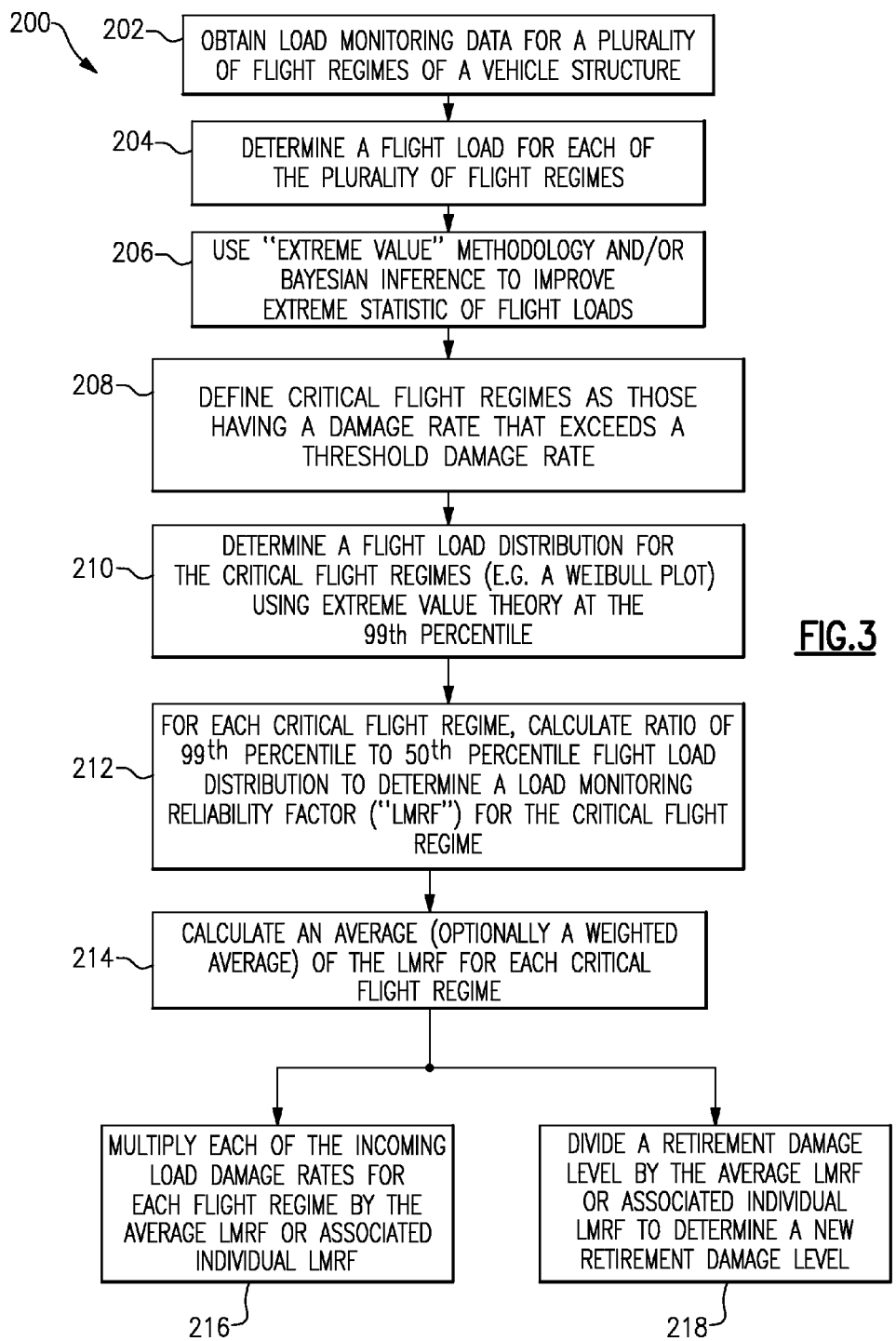
FIG. 3 schematically illustrates a method of updating a lifetime of a component in response to load monitoring data.

FIG. 3 schematically illustrates a method 200 to add back the two reliability nines ("2-9's") by updating a lifetime of a component in response to load damage data, such that actual load damage data can be used while still achieving a "6-9's." The method 200 modifies running "damage" calculations from a Health and Usage Monitoring System ("HUMS") or Load Monitoring System ("LMS") by multiplying the measured flight loads for each identified flight regime by fixed component-specific reliability factors that are based on the likely statistical variations in that flight load in service. These factors are called Load Monitor Reliability Factors ("LMRF"). Because the potential statistical variation in the flight loads experienced by a component in a specific flight regime on a specific aircraft is best described by the distribution of the flight loads for the same flight regime for the entire fleet of the same type of aircraft, the fixed reliability factor or factors for any component and flight regime can be determined from the known fleet variability in actual loads experienced. The LMRF is proposed to be the ratio of the 99th percentile to the 50th percentile of the flight loads experienced in the specific flight regimes that are considered critical in the damage calculation for each fatigue-substantiated component. Of course, it is understood that other ratios could be used in determining the LMRF. For example, one may wish to use other ratios if not using the conventional "6-9's" reliability approach.

Steps 202-214 of the method 200 identify how the factor or factors are calculated. Referring to FIG. 3, load damage data is received for a plurality of flight regimes of a vehicle structure (step 202). One example vehicle structure is that of a rotary-wing aircraft, such as a helicopter, in which the load damage data can be received from a Health and Usage Monitoring System ("HUMS") or Loads Monitoring system ("LMS") module 46 (see FIG. 4).

Figure 4:
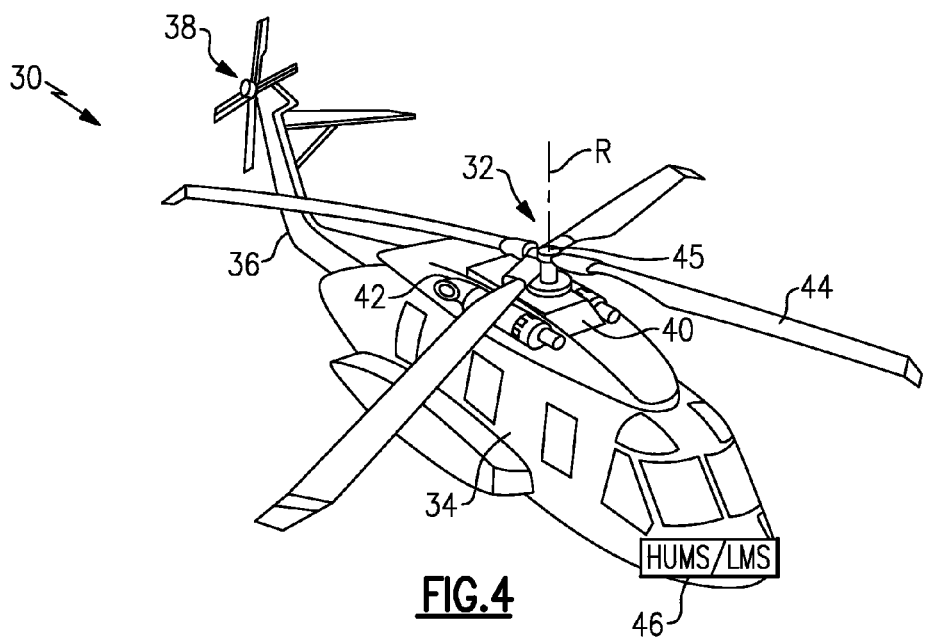
FIG. 4 schematically illustrates rotary-wing aircraft to which the method of FIG. 3 may be applied.

FIG. 4 schematically illustrates an exemplary rotary-wing aircraft 30 to which the method 200 may be applied. The aircraft 30 in the disclosed, non-limiting embodiment includes a main rotor system 32 supported by an airframe 34 having an extending tail 36 which mounts an anti-torque system 38. The main rotor assembly 32 is driven about an axis of rotation "R" through a main rotor gearbox ("MGB") 40 by a multi-engine powerplant system 42. The multi-engine powerplant system 42 generates the power available for flight operations and couples such power to the main rotor assembly 32 and the anti-torque system 38 through the MGB 40. The main rotor system 32 includes a plurality of rotor blades 44 mounted to a rotor hub 45 driven by a main rotor shaft. Although a particular helicopter configuration is illustrated and described in the disclosed embodiment, other configurations and/or machines, such as high speed compound rotary-wing aircraft with supplemental translational thrust systems, dual contra-rotating, coaxial rotor system aircraft, turboprops, tilt-rotors tilt-wing aircraft and non-aircraft applications such as wind turbines will also benefit herefrom.

Figure 8:
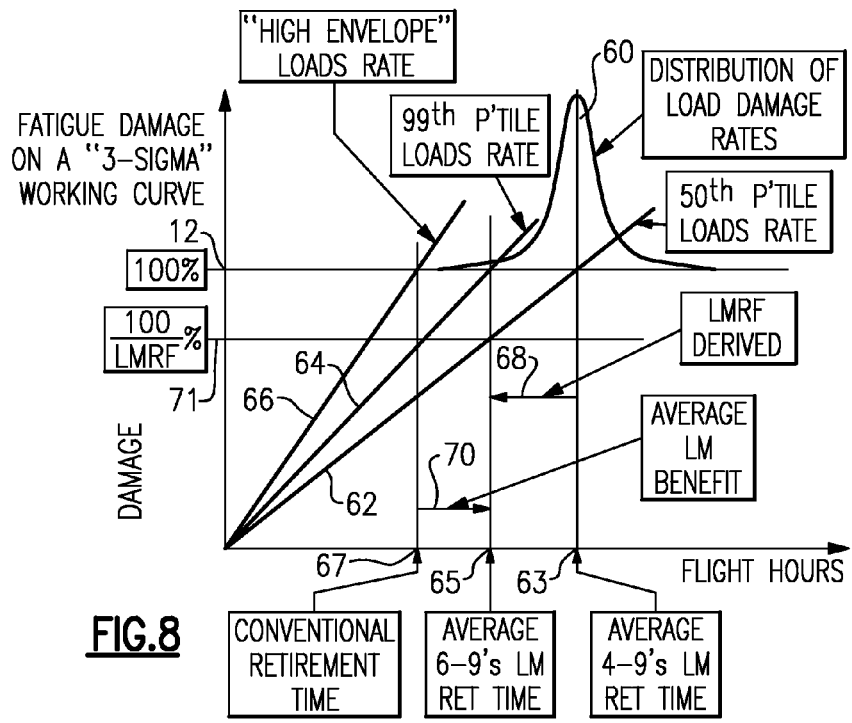
FIG. 8 is a graph that illustrates how the "high-envelope" load assumption compares to actual flight load data for a fleet of aircraft.

The aircraft 30 is equipped with a HUMS or LMS module 46 that records flight loads and calculates load damage rate data for daily transmission to a Fleet Management Operations Center (see FIG. 8). Thus, in step 202 load damage rate data may be received from the HUMS module 46.

Referring again to FIG. 3, a load damage rate count is determined for each of the plurality of flight regimes of the aircraft 30 (step 204). A load damage rate depends on the magnitudes of each flight load recorded and the number of times that the flight loads occurred in the period of flight time that is reported in the daily transmission of data.

Figure 5:
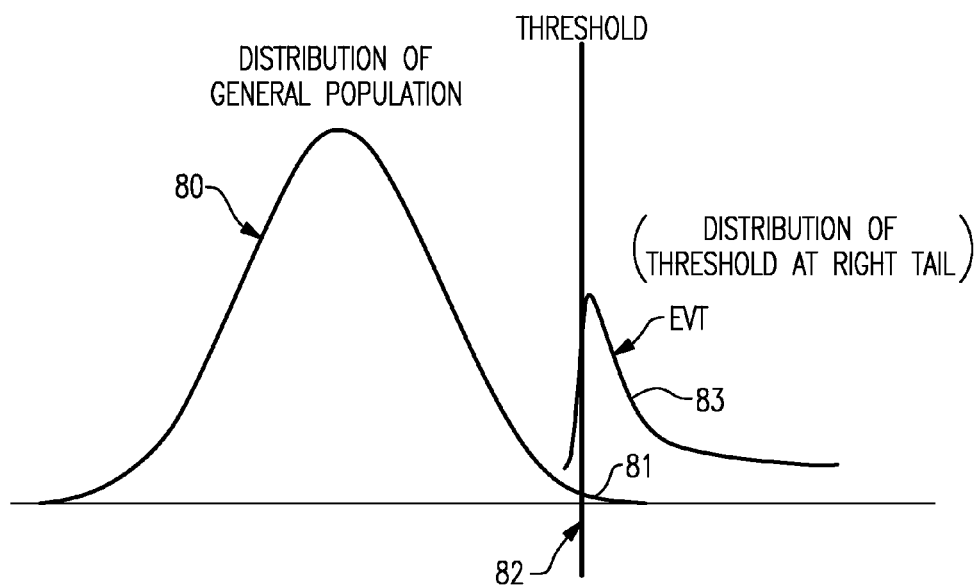
FIG. 5 illustrates an example peak load distribution with notional right tail behavior.
Figure 6:
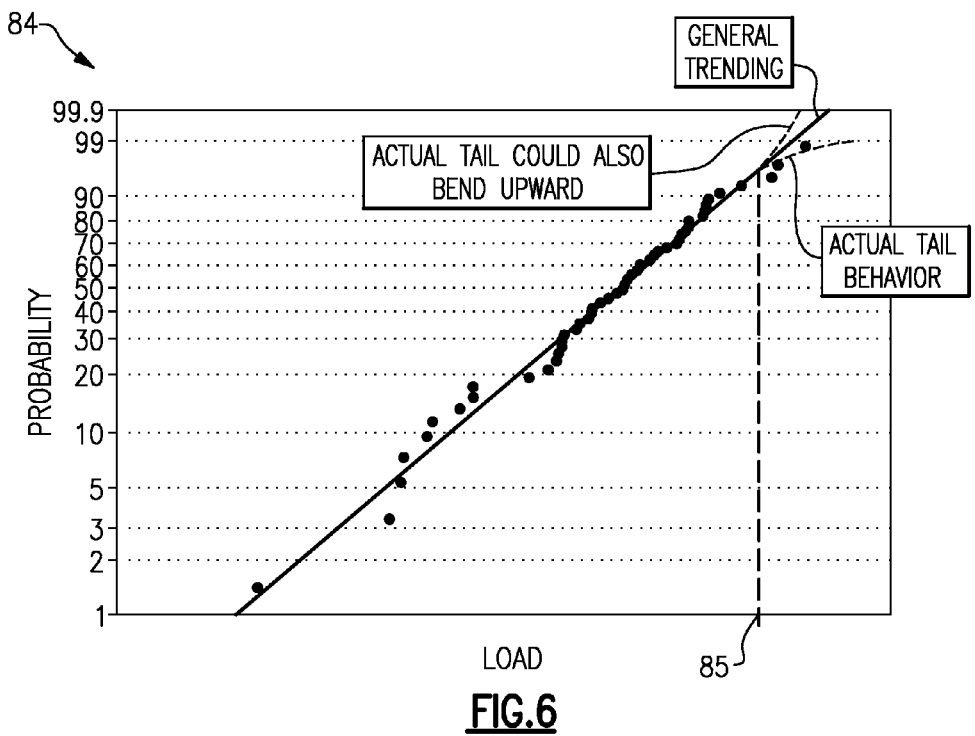
FIG. 6 is a distribution fitting plot that illustrates potential departure of the flight load at the right tail region.

As discussed above, data at the 99th percentile may be used in calculating the LMRF. However, there may be uncertainty or low confidence in the accuracy of such data, especially if fleet load damage data comes from a small sample size. FIG. 5 illustrates an example flight load distribution 80. A portion or "tail" 81 of the distribution 80 occurs past a 99th percentile threshold 82. An extreme value distribution 83 at the right tail 81 may differ significantly as compared to the distribution of general population 80. As seen in FIG. 5, because only a small amount of data may be included in the tail 81, it may be hard to verify the accuracy of the data. FIG. 6 illustrates a probability distribution fitting of flight load data 84 that also shows the sparse nature of 99th percentile data (see data to the right of indicator 85).

A large amount of actual data is required to accurately describe tail 81 behavior via conventional descriptive statistics. This is especially true for "high-envelope" extreme loads, for which the 99th percentile is needed to provide approximately "2-9's" of reliability contribution. To address this uncertainty, a unique "extreme value" methodology with a Bayesian inference may be used (step 206), as discussed below.

Extreme Value Theory

An important class of probability problems are those involving the extreme values of a random variable, that is, the "largest" or "smallest" values of a random variable. Statistically, this includes values that are pertinent to the maximum and minimum values from a set of observations. The subject of extreme value theory is a subtopic within the broader subject of order statistics, that is, the statistics of the $k^{th}$ value from top or bottom of an ordered dataset.

Extreme value distributions are the limiting distributions for the minimum or the maximum of a collection of random observations from the same arbitrary distribution. Extreme value distributions may be used to characterize statistical behavior of a tail (either left or right) given information about behavior of general population of the data. Extreme value distributions provide a theoretical framework for studying rare events by focusing on the tails of probability distributions. The prediction of future conditions is often required in engineering design. To find an intelligent approach extrapolating the anticipated maximum design value from previously observed extreme value data, therefore, is necessary. For this purpose, the asymptotic theory of statistical extremes often provides a powerful basis for developing the required engineering information.

To sustain a desirable reliability margin for fatigue substantiation, an assumed "high-envelope" flight test loads (see extreme value theory distribution 83 in FIG. 5), representing approximately 99th percentile values (see 82), are used in conventional fatigue damage calculation. The selection of the 99th percentile levels of applied loads approximately provides two nines ("2-9's") contribution of the overall six nines ("6-9's") reliability. As discussed above, it is proposed that factors adding 2-9's of reliability to loads monitor life calculations can be the ratios of the 99th to 50th percentiles of measured flight loads distributions. Generally, accurately describing tail behavior of the peak loads via conventional descriptive statistics requires a large amount of observed flight test loads data. To address the technical challenge, the concept of extreme value theory is adopted, and associated statistical models can be developed and applied to provide a feasible solution to accurately estimating right tail behavior of extreme loads from observable flight loads test data.

Bayesian Inference

Another methodology proposed in conjunction to the extreme value theory is the Bayesian inference. Bayesian inference is a statistical procedure in which probabilities are interpreted not as frequencies or proportions or the like, but rather as degrees of belief. A Bayesian approach starts with the formulation of a model that is assumed to adequately describe the situation of interest. Then, a prior distribution is formulated over the unknown parameters of the model, which is meant to capture beliefs about a situation before observing additional data. Once additional data is observed, Bayes' Rule, as defined below, is applied to obtain a posterior distribution for these unknowns, which takes account of both the prior knowledge and the observation data.

$$p(\theta | D) = \frac{p(D | \theta)p(\theta)}{p(D)} = \frac{p(D | \theta)p(\theta)}{\int p(D | \theta)p(\theta)d\theta} \quad \text{equation \#1}$$

where $p(\theta)$ is a prior density function;
$\theta$ is a vector of distribution parameters of interest; and
D is a vector of observed data;)
$p(D|\theta)$ is a probability density of observed data given the prior density function; and
$p(\theta|D)$ is a posterior density function.

The aforementioned methodology can be applied to enhance fidelity and accuracy of statistical models (step 206). The original statistical characteristics for extreme flight loads may be established based on a limited amount of data with previous experience for the similar maneuvers. A Bayesian inference may then be applied periodically to update the prior estimate incorporating additional flight test and fielded load monitoring data.

Figure 7:
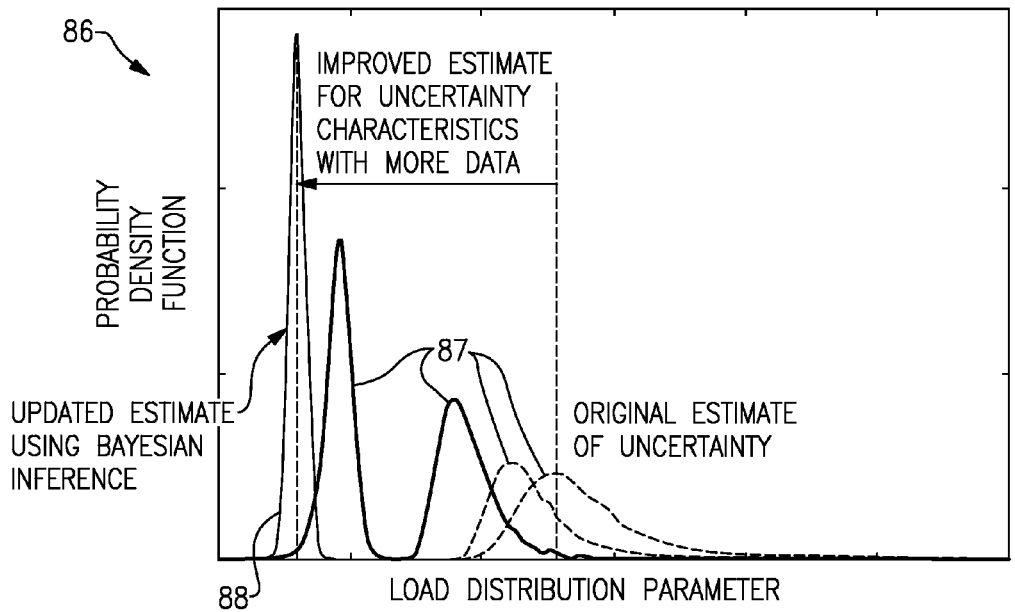
FIG. 7 is a graph that illustrates the effect of a Bayesian inference in reduction of scatter associated with a distribution of load parameters.

FIG. 7 is a graph 86 illustrating an improvement in terms of reduction of uncertainty of statistical distribution describing tail 81 between data cluster 87 and data 88 by applying step 206. Notably, data 88 has improved certainty in that there is less scatter (i.e. narrower dispersion associated with the distribution along the "x" axis).

It is understood that step 206 could include using only the "extreme value" methodology, could include using only a Bayesian inference, or could include using both the "extreme value" methodology and a Bayesian inference.

Determination of Critical Flight Regimes

Critical Flight Regimes for a Loads Monitoring damage calculation are those that exceed a threshold of damage rate when measured flight loads are used. These measured loads result in a damage rate that is a significant contributor in the damage calculation. However, it is to be understood that other criteria could be used to determine which flight regimes are critical.

Referring to FIG. 3, once critical flight regimes are determined, a distribution of the flight loads measured in service (i.e. actual flights) is determined for each of the critical flight regimes (step 210). This may include, for example, preparation of a Weibull plot, such as the Weibull plot 84 of FIG. 6.

A Load Monitoring Reliability Factor ("LMRF") is determined (step 212) in response to the Weibull plot 84. The LMRF is proposed to be the ratio of the 99th percentile to the 50th percentile of the fleet rates of occurrence of the specific flight regimes that are critical in the damage calculation for each fatigue-substantiated component. For reasons that will be discussed below, this specific ratio can provide a "2-9's" of reliability in the life axis, and can be employed as a simple multiplication factor to the recorded flight loads.

In some examples step 212 may include determining a LMRF for multiple flight regimes. In such an example, an average of the LMRF for each critical flight regime may be determined (step 214). In some cases a simple average of LMRF values may be considered appropriate. Of course, it is to be understood that different components may have varying quantities of critical flight regimes, and thus may require performing a weighted average in step 214. Some regimes could be considered to be more or less relevant than other regimes in such a weighting algorithm. Alternatively, and most accurately (in a scenario where a plurality of critical flight regimes are being considered), the individual LMRF for each associated flight regime could be applied individually to the measured flight load for that flight regime. Thus, step 214 is optional and may not be performed in certain applications.

Thus, steps 202-214 may be performed to determine LMRFs for each critical flight regime, which then may then be applied to determine a revised component life. One way of applying the LMRF is to multiply each measured flight load by LMRF to determine a more reliable load damage value (step 216). That is, the HUMS running damage calculations may multiply the flight loads of step 202 by the LMRF of step 214.

In another embodiment, an additional or alternative way of applying the LMRF is to divide a retirement damage level (see indicator 12) by the LMRF to determine a new retirement damage level (step 218).

As discussed below, the steps 216, 218 enable a vehicle part to have a prolonged retirement time based at least in part upon actual load damage data while still maintaining "6-9's" reliability, effectively re-gaining the margin 18 of ("2-9's") that is lost when incorporating actual flight loads without correction.

How LMRF Affects Retirement Time

Figure 9:
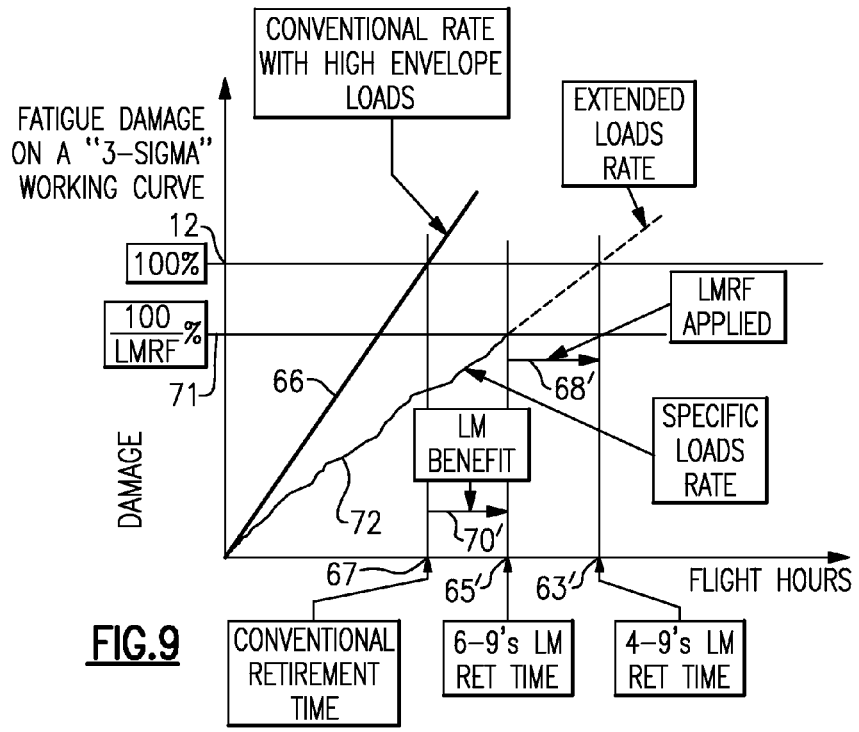
FIG. 9 is a graph that illustrates how a component retirement occurring is affected by incorporating a Load Monitor Reliability Factor ("LMRF").

FIGS. 8 and 9 are graphs showing how the LMRF affects retirement time, with FIG. 8 showing a fleet, and FIG. 9 showing a single usage.

FIG. 8 is a graph which shows how the "high-envelope" loads assumption 66 compares to actual load damage data 72 for a fleet of aircraft as shown in fleet load damage distribution 60. An average fleet load damage 62 (i.e. $50^{th}$ percentile) has a retirement time 63. At the 99th percentile (i.e. only 1 in 100 maneuvers are flown more aggressively) the fleet load damage 64 has a retirement time 65 that is shorter than the retirement time 63, but is still more than the conservative "high-envelope" load damage 66 having retirement time 67. Arrow 68 shows the margin between $50^{th}$ and 99th percentile used to determine the LMRF. Arrow 70 shows a retirement time extension achieved for the aircraft fleet by using the LMRF. Indicator 71 shows a value of 100% divided by the LMRF (as described in step 116). Thus, as shown in the example of FIG. 8, to determine a new component retirement time using the LMRF, either the flight hour time along the horizontal axis can be reduced, or the retirement time along the vertical axis can be reduced.

FIG. 9 is a graph that illustrates how the component retirement time (see indicator 12) occurring when the HUMS running damage calculation, multiplied by the LMRF, reaches 100% (see retirement time 65'). Alternatively the damage calculation could employ the actual load damage, and a part could be retired when the total damage reaches a value of 100% divided by the LMRF (see indicator 71, and step 216). Note what happens in FIG. 7 if the measured load damage profile are equal to or more severe than the "high-envelope" load damage assumption. A retirement time less than the conventional retirement time results because of the LMRF. This may seem counter-intuitive since it is said that the conventional retirement time (indicator 12) protects even the worst case user. However, the conventional retirement time does still offer protection, but possibly with a reduced reliability.

As shown in FIG. 9, by applying the LMRF, the retirement time of the aircraft is extended from time 67 to time 65' (see arrow 70' for magnitude of extension). New retirement time 65' is shorter than the "5-9's" retirement time 63' that is based only on load damage. By using the LMRF, retirement time is extended to the time 65', and "6-9's" is achieved. In this example then, there is a retirement time increase for an average user, even when the LMRF is imposed. The LMRF is shown as a reduction in the allowable Flight Hours (see 65'), but can also be shown as a reduction in the allowable damage in the running component life calculation (see 71).

The availability of the compiled Structural Load Damage Monitor data (step 202) from an entire fleet of the same type of aircraft can be used to determine statistical distributions of the rates of occurrence of critical flight regimes. This will now be discussed in the context of an aircraft HUMS application.

HUMS/LMS Configuration

Figure 10:
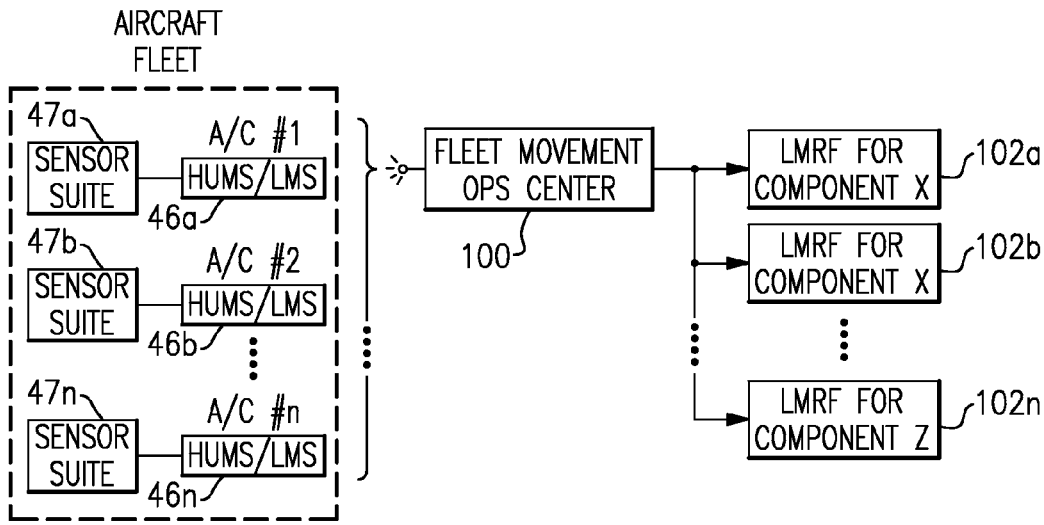
FIG. 10 schematically illustrates a load monitoring data transmission configuration.

As discussed above, FIG. 4 schematically illustrates an exemplary aircraft 30. Each aircraft 30 in the helicopter fleet is equipped with a Health and Usage Monitor System or Loads Monitor System 46, which records flight loads data using a sensor suite 47 (see FIGS. 4 and 10). The sensor suite 47 may include, for example, load sensors. Of course, it is possible data from multiple flight loads could be recorded using other sensors. A plurality of HUMS modules 46a-n record and transmit flight load data and/or load damage data daily to the Fleet Management Operations Center 100 (illustrated schematically in FIG. 10). That is, the HUMS modules may simply transmit load data so that a computer on ground, for example, could process the data to extract load damage data, or the HUMS modules could transmit processed load damage data. The Fleet Management Operations Center 100 processes the Flight Loads data to (1) construct distributions of flight loads for the critical flight regimes from a sample of actual loads experienced in the fleet, in order to determine LMRFs for a variety of components of the aircraft, and (2) compile the loads damage accrued on each individual component on individual aircraft in order to adjust that component's retirement time, including the effect of the LMRF on component reliability (quantity of "9's" achieved).

Figure 11:
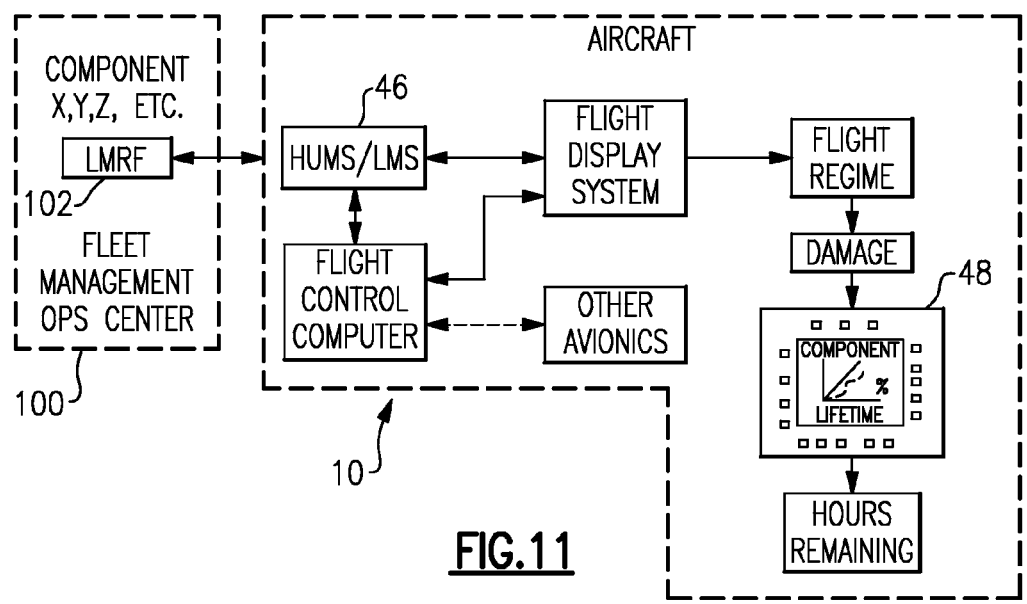
FIG. 11 schematically illustrates other aspects of the load monitoring data transmission configuration of FIG. 10.

Referring to FIG. 11, the LMRF 102 for the main rotor hub 45 in the disclosed example and every other LMRF for respective other flight critical components may be downloaded into a module such as the HUMS/LMS module 46 which may operate as an interface with the flight computers and avionics on the aircraft. The HUMS/LMS module 46 may then use the LMRF to determine and display (see display 48) a modified lifetime for each flight critical component. In one non-limiting embodiment, the modified lifetime may be displayed as a percentage of remaining (modified) lifetime for that aircraft at that moment in time. The onboard calculation may be a load damage calculation which is related to the measured flight loads, the flight regimes and the flight hours for that aircraft at that moment in time.

The HUMS/LMS module 46 executes a load damage rate monitoring algorithm (steps 202, 204). The functions of the algorithm are disclosed in terms of functional block diagrams (see FIG. 11), and it should be understood by those skilled in the art with the benefit of this disclosure that these functions may be enacted in either dedicated hardware circuitry or programmed software routines capable of execution in a microprocessor based electronics control embodiment. In one non-limiting embodiment, the module may be a portion of a flight control computer, a portion of a central vehicle control, an interactive vehicle dynamics module, a stand-alone line replaceable unit or other system.

The HUMS/LMS module 46 typically includes a processor, a memory, and an interface. The processor may be any type of known microprocessor having desired performance characteristics. The memory may, for example only, includes UVPROM, EEPROM, FLASH, RAM, ROM, DVD, CD, a hard drive, or other computer readable medium which stores the data and control algorithms described herein. The interface facilitates communication with other aircraft avionics and systems as well as facilitates communication with the Fleet Management Operations Center 100 through, for example, a wireless connection and/or through download. The Fleet Management Operations Center 100 is a ground-based computer located at a central location, and may include one or more computers.

It should be noted that a computing device can be used to implement various functionality, such as that attributable to the Fleet Management Operations Center 100 which may operate as a central repository for data from a multiple of aircraft fleets to determine the LMRF 102. In terms of hardware architecture, such a computing device can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory can include any one or combination of volatile memory elements (e.g. random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program may be translated via a compiler, assembler, interpreter, or the like, which may or may not be included within the memory.

The Input/Output devices that may be coupled to system I/O Interface(s) may include input devices, for example but not limited to, a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance but not limited to, a modulator/demodulator (e.g. a modem for accessing another device, system, or network), a radio frequency (RF) or other transceiver, a telephonic interface, a bridge, a router, etc.

When the computing device is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed.

A Brief Review of Advanced Probabilistic Methodologies

The description below will provide a statistical proof for how the method 200 achieves an additional two "9s" by presenting a fatigue reliability assessment model ("FRAM") using advanced reliability methodologies to estimate the underlying reliability and evaluate the proposed Load Monitoring Reliability Factor ("LMRF").

Probabilistic methodologies have been applied in various engineering fields and industries for uncertainty quantification and associated risk management. In recent decades, increasing demands for better understanding the effects of variabilities and scatters in design, manufacturing, operation, and management triggers significant advancement of more robust and efficient probabilistic methodologies and further applications.

Figure 12:
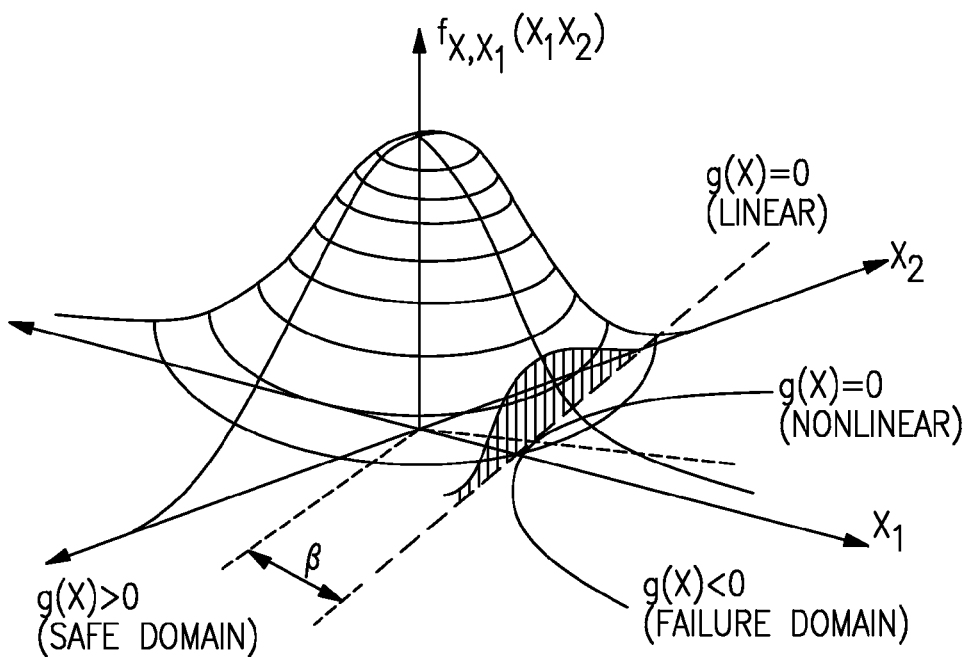
FIG. 12 is a graph that illustrates a limit state and joint probability density function.

In general, a reliability problem is defined by a so-called scalar performance function (also referred as limit state function) g(X) in an n-dimensional space where g(X)<0 denotes the failure domain F. As shown in FIG. 12, the vector of random variables X is characterized by a joint probabilistic density function $f_x(x)$. The associated probability of failure can be estimated by:

$$p_F = \int_{g(X)} f_X(x)\,dx = \int_{R^n} I_F(x) f_X(x)\,dx \qquad \text{equation \#2}$$

where $p_F$ is a probability of failure;
g(X) is a scalar performance function;
$f_x(x)$ is a joint probabilistic density function;
$I_F(x)$ is an indicator function of the failure domain F (see FIG. 12); and
$R^n$ is a n-dimensional real space.

Among the procedures developed for the structural reliability assessment and failure probability prediction, a prominent position is held by the simulation methods. The Monte Carlo simulation technique, as the basis of all simulation based techniques, is the most widely applied numerical tool in probabilistic analysis. The associated estimator of probability of failure can be expressed as shown in equation #3 below.

$$\hat{p}_F = \frac{1}{N}\sum_{i=1}^{N} I_F(x^{(i)}),\ x^{(i)} \text{ i.i.d.} \sim f_X(x) \qquad \text{equation \#3}$$

where $\hat{p}_F$ is a estimated probability of failure;
N is a fatigue life (in million cycles); and
$x^{(i)}$ i.i.d. is an $i^{th}$ sample vector containing sampling data generated from independent and identically-distributed random variables.

The convergent rate of the Monte Carlo ("MC") estimator, in terms of mean square, is appropriately measured by the coefficient of variation ("CoV") of the estimated probability of failure, shown by equation #4 below.

$$CoV_{MC} = \frac{\sqrt{\text{Var}[\hat{p}_F]}}{p_F} = \sqrt{\frac{(1-p_F)}{Np_F}} \qquad \text{equation \#4}$$

where CoV is the coefficient of variation; and;
MC is the Monte Carlo estimator; and
$p_F$ is the probability of failure.

It is noted that the above equations are independent of dimensionality of the random vector X. A benefit of a Monte Carlo simulation is its easiness to understand and implement. It can provide an accurate prediction if the sample size for simulation is sufficiently large. A disadvantage associated with Monte Carlo simulation is its inefficiency in estimating a small probability of failure due to the large number (roughly proportional to $10/p_F$) of samples needed to achieve an acceptable level of accuracy (CoV of 30% or lower). For probabilistic application to a rotorcraft structural problem, a target reliability of 6-9's is generally required. This means that the probability of failure is less than or equal to $10^{-6}$ within the lifetime of the component. Therefore, 10 million simulation samples would be required to provide an acceptable estimator of failure probability.

In addition to the Monte Carlo simulation techniques, several emerging methodologies for reliability analysis have been developed in the last three decades. The fast probability integration ("FPI") methodologies, including (1) first order reliability methods ("FORM"); (2) second order reliability methods ("SORM"); and (3) other hybrid methods (such as Importance Sampling), have been developed as effective alternates for fast probability assessment without compromising the accuracy of results.

The FORM converts a multi-dimensional integration problem into a constrained linear stochastic optimization. In FORM, an iterative procedure is employed to find global minimum from the limit state surface to the origin of physics space using linear approximation of the limit state. For the case of a linear limit state function with Gaussian variables, FORM leads to an exact solution. If the limit state function becomes nonlinear or non-normal random variables are encountered, the accuracy and efficiency of FORM needs to be further improved.

The Second order reliability method (SORM) was developed to address the aforementioned concern. It approximates the limit state function by an incomplete second order polynomial with the assumption of maintaining the rotation symmetry requirement. It has been proven mathematically that SORM asymptotically provides sufficiently accuracy for large $\beta$ values. This implies SORM is a good candidate for a small failure probability prediction, as generally required in the rotorcraft industry.

The Importance Sampling technique is another attractive alternative. It has been regarded as one of the most prevalent approaches in the context of simulation-based methods for probabilistic analysis. Instead of drawing random samples arbitrarily as implemented in a Monte Carlo simulation, the Importance Sampling approach focuses on the region that contributes the most of failure points along the limit state surface. The important region can be identified by either MPP obtained through FORM or SORM solution or the prior estimate from pre-sampling. In general, the efficiency of Importance Sampling technique improves significantly with a large reduction of the variance of estimator, once the appropriate Importance Sampling density function is identified.

Figure 13:
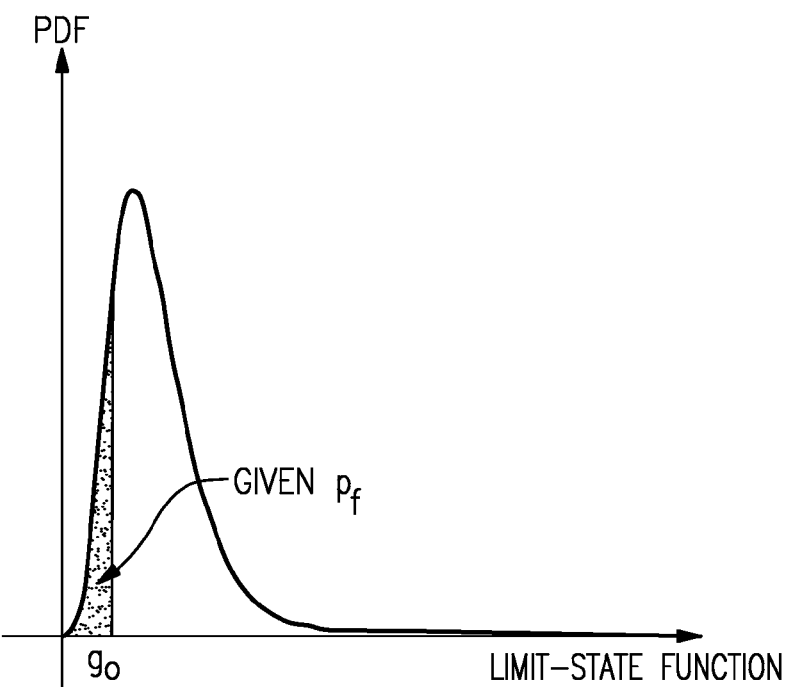
FIG. 13 is a graph that illustrates a notional sketch of inverse reliability analysis.

In reliability analysis, the probability of failure (as a measure of reliability) is evaluated at a prescribed value for a defined limit function with supporting statistical characterization of the uncertainty involved. Very often, we are encountering applications considering a problem with a limit state function involving one unknown parameter. We seek to determine the unknown parameter such that a prescribed reliability index or threshold level of probability of failure is attended, as depicted in FIG. 13. As shown in FIG. 13, given a known $p_F$, one can inversely determine $g_0$.

In theory, this type of problem can be solved iteratively by either repeating FORM/SORM analyses with varying $\theta$ until $\beta=\beta_T$ or a large sample Monte Carlo simulation covering the problem domain with desired accuracy. Although the aforementioned approaches may be tedious and often impractical, a direct and more efficient solution is proposed by Der Kiureghian and Zhang in the paper entitled "Inverse Reliability Problem," published in the ASCE Journal of Engineering Mechanics, Vol. 98, No 1, pp. 1-16, 1994.

Development of an Advanced Fatigue Reliability Assessment Model ("FRAM")

As discussed earlier, the safe-life approach has been widely applied in the industry for fatigue design and substantiation. For the case under constant amplitude load, the safe-life approach can be expressed via a standard S-N relationship, such as:

$$\frac{S}{S_E} = 1 + \frac{\beta}{N^\gamma} \qquad \text{equation \#5}$$

where S is an applied vibratory stress;
$S_E$ is an endurance limit representing a threshold below which no fatigue initiation may be expected; and
$\beta$ and $\gamma$ are shape parameters.

Fatigue strength parameters, $\beta$, $\gamma$, and $S_E$, may be obtained through statistical analysis of fatigue test data.

In general, due to various usage and mission profiles, the vibratory load applied on rotorcraft dynamic structures exhibit variable amplitude nature. To properly account for cumulative damage under different usage profiles, the Miner's rule may be employed. In case of M flight regimes and K different cycles per each regime, cumulative damage per fixed time $t_0$, can be calculated as follows:

$$\tilde{d}_{t0} = \sum_{m=1}^{M}\sum_{k=1}^{K}\left\{\frac{\tilde{n}_{mk}}{\tilde{N}(\tilde{S}_{mk})}\right\} \qquad \text{equation \#6}$$

$$\tilde{S}_{mk} = \tilde{U}_m \tilde{L}_m z_{mk} \qquad \text{equation \#7}$$

$$\tilde{n}_{mk} = (\varpi_m t_0)\tilde{U}_m \tilde{C}_{mk} \qquad \text{equation \#8}$$

where M is a quantity of flight regimes;
K is a quantity of cycles per regime;
$\tilde{N}$ is the calculated number of cycles for the m-th flight regime at the k-th bin;
$\tilde{S}_{mk}$ is the peak load for the m-th flight regime at the k-th bin;
$\tilde{U}_m$ is the percentage usage contribution of the m-th flight regime;
$\tilde{L}_m$ is the peak load(s) associated with the m-th flight regime;
$z_{mk}$ is a portion of peak load associated with the m-th flight regime at the k-th bin;
$\tilde{n}_{mk}$ is the actual number of cycles for the m-th flight regime at the k-th bin;
$\overline{\omega}_m$ is a basic frequency;
$t_0$ is a fixed time; and
$\tilde{C}_{mk}$ is the cycle count for the m-th flight regime at the k-th bin.

Therefore, assuming that lifetime t is much longer than $t_0$, and suggesting the same load damage spectrum distribution during the entire life, a random damage distribution $\tilde{d}_t$ can be defined as follows:

$$\tilde{d}_t=(t/t_0)\tilde{d}_{t0} \qquad \text{equation \#9}$$

Fatigue failure is assumed to occur when the total cumulative damage exceeds 1, Therefore, the probability of failure due to the excessive cumulative fatigue damage in a specified time t, can be calculated as the following probability:

$$p_F=P(\tilde{d}_t>1)=P[(t/t_0)\tilde{d}_{t0}>1] \qquad \text{equation \#10}$$

As discussed in the earlier sections, there are three major sources of uncertainty that significantly contribute to the scatter of fatigue life, including variation of usage, scatter associated with applied load, and inherent randomness of the fatigue endurance limit. The statistical models describing variability for usage, load, and fatigue strength can be established through analysis of fielded usage, flight loads testing, and laboratory fatigue testing. The details to establish statistical models were discussed in Zhao, J., Structures Technologies for CBM (2007-C-10-01.1-P3), Final Report Submitted to CRI for CRI/NRTC CBMT Program, Jul. 2008.

The aforementioned fatigue damage accumulation model, as defined via equations #5-10, has been further implemented as a user-defined limit state function. The potential random variables are allocated in the limit state and their statistical models (in terms of type of statistical distribution, associated distribution parameters, and correlation/covariance structure) are defined in an input file, along with the user-specified options for method selection, accuracy, convergence control, and target sample size.

The advanced probabilistic methodologies have been applied to the safe-life approach as the means to estimate the underlying structural reliability. The new approach for fatigue reliability assessment has been studied extensively previously (see (1) Ditlevsen, O. and Madsen H. O., Structural Reliability Methods, 1996, (2) Zhao, J. and Haldar, A. Reliability-based Structural Fatigue Damage Evaluation and Maintenance Using Non-destructive Inspections. Haldar A, Guran A, Ayyub BM. Uncertainty Modeling in Finite Element, Fatigue and Stability of Systems. World Scientific, New York, 1997. p. 159-214). Also, numerical efficiency and accuracy of the advanced probabilistic methods have been performed via an AHS Fatigue Reliability Round Robin case. The outcomes of the study fully justifies the advanced probabilistic methods are numerically accurate and efficient for fatigue reliability applications.

Evaluation of the FRAM Model Using an Existing Fatigue Reliability Study

As a "calibration", the FRAM model is used to estimate the reliability of a Main Rotor Shaft. The conventional fixed retirement time for this early configuration shaft is 1000 hours. The reliability study used a simple, but cumbersome, Monte Carlo approach with the established laboratory fatigue strength, a flight loads survey, and a full usage spectrum of 178 flight regimes. The scatter associated with each regime is represented by a random usage percentage and an associated random flight load. Cycle counts are applied to place peak loads into up to 4 bins. The variability associated with the mean fatigue endurance limit is also considered as a random variable with a CoV of 10%. In total there were 357 random variables considered in this study. The result is that a reliability slightly higher than 6-9's is estimated for the 1000 hour conventional retirement time.

The FRAM probabilistic fatigue analyses are performed at a specified life achieving the notional "6-9s" reliability. FORM and SORM are employed to determine the probability of failure. Information Sampling ("IS") with 200,000 samples and 11 million samples of BMC (Monte Carlo) are also applied for additional verification. The results are summarized in Table 1 below.

The FRAM estimate of the shaft reliability for the 1000 hour life is 0.999998, or $9_58$ ($2 \times 10^{-6}$ probability of failure) and results obtained from various algorithms in general agree very well. The FORM solution predicts failure probability of $1.79 \times 10^{-7}$, which is one magnitude lower than the follow-on SORM analyses. The underestimation is attributed to a high nonlinear behavior exhibited in this particular case, which causes a further challenge to the basic assumption of hyperplane approximation for the limit state used in the FORM algorithm. Follow-on SORM provides further correction by incorporating information of main curvature and contribution from high orders. The results are significantly improved. The results obtained from IS and BMC agree with the SORM predictions. In this case, the curvature fitting approach employed in the first three SORM algorithms outperforms the ones using point fitting options.

TABLE 1

Comparison of Results of Shaft Probabilistic Fatigue Analyses

| Method | Rel Index | Pf | CoV_pf |
|---|---|---|---|
| FORM | 5.09 | 1.79E−07 | N/A |
| SORM_CurvFit_Breitung | 4.6711 | 1.50E−06 | N/A |
| SORM_CurvFit_impBreitung | 4.6533 | 1.63E−06 | N/A |
| SORM_CurvFit_Tvedt | 4.6776 | 1.45E−06 | N/A |
| SORM_PointFit_Breitung | 4.7116 | 1.23E−06 | N/A |
| SORM_PointFit_impBreitung | 4.6952 | 1.33E−06 | N/A |
| SORM_PointFit_Tvedt | 4.7167 | 1.20E−06 | N/A |
| IS_200K | 4.6018 | 2.09E−06 | 1.52E−02 |
| BMC_11M | 4.5847 | 2.27E−06 | 6.32E−02 |

Figure 14:
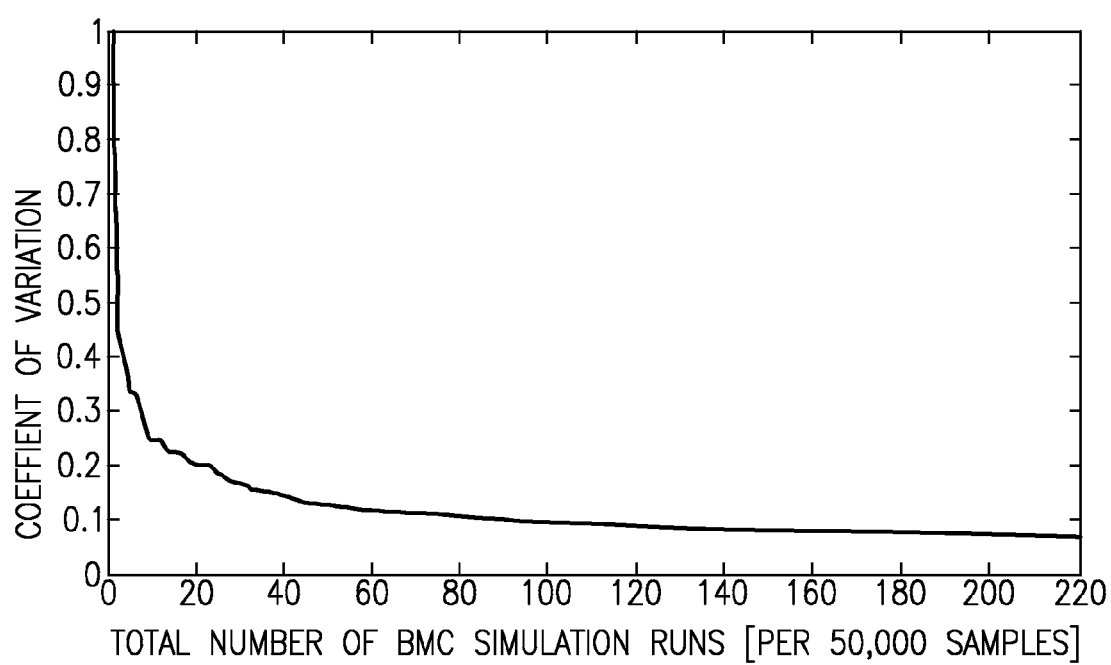
FIG. 14 is a graph that illustrates a plot convergence for a prediction as a function of sample size.

It is important to reinforce our previous discussion on the convergence issue associated with a Monte Carlo simulation, as defined in equation #3. As depicted in FIG. 14, the error of the predicted probability of failure (in terms of CoV of the prediction) drops significantly at the beginning when the sample size increases. After it reaches the 25% mark using 100,000 samples, the rate of convergence starts to decay. The CoV can be further reduced to 12% if 500,000 samples are used. Finally, the CoV of 6.28% is achieved after 11 million samples, which takes more than one hundred hours to run. Using Importance Sampling, the efficiency of simulation has been significantly improved. In one example the simulation took an hour and half running time and achieved the same level of the estimated probability of failure with higher accuracy.

The results obtained from SORM, IS and BMC agree with the findings by Thomson and Adams in their earlier study (see Thompson, A. E., and Adams, D. O., "A Computational Method for the Determination of Structural Reliability of Helicopter Dynamic Components," 46th Annual Forum of the American Helicopter Society, Washington, D.C., May 1990), in which the same data set had been used to demonstrate the notional 6-9's reliability approach.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

It should also be understood that although a ratio of 99th to 50th percentile of usage data values is described in relation to determining the LRMF, it is understood that other ratios could be used, and that the ratio of 99th to 50th percentile is only one example ratio pertinent to the currently used conventional "6-9's" reliability allocation.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art may recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A method comprising:
accessing distributions of flight loads associated with one or more flight regimes for a fleet of aircraft; and
a computer determining a factor for at least one of the flight regimes using the distributions of flight loads, wherein the factor provides a flight load adjustment for a component on each aircraft of a fleet of aircraft known to be affected through at least load damage by the at least one flight regime, and wherein said step of determining a factor for at least one of the flight regimes includes:
A) identifying a critical flight regime from the occurrence distribution;
B) determining a 99th percentile flight load value for the critical flight regime in the occurrence distribution;
C) determining a 50th percentile flight load value for the critical flight regime in the occurrence distribution; and
D) defining the factor as a ratio between the 99th percentile and 50th percentile flight load values for the critical flight regime.

2. The method as recited in claim 1, wherein said determining, using the distributions of flight loads, a factor for at least one of the flight regimes that provides a flight load adjustment for a component on each aircraft of a fleet of aircraft known to be affected through at least load damage by the at least one flight regime includes:
E) selectively repeating steps (A)-(D) for each of a plurality of critical flight regimes; and
F) defining the factor as a weighted average of factors for individual critical flight regimes.

3. The method as recited in claim 1, wherein said identifying a critical flight regime from the occurrence distribution includes identifying a flight regime as a critical flight regime in response to the flight regime having a rate of damage with measured loads that exceeds a predefined threshold.

4. The method as recited in claim 1, further including:
determining, using at least the factor, instructions to modify a lifetime of the component for a selected one of the aircraft from the fleet; and
communicating the instructions to an entity configured to use the instructions to modify the lifetime of the component.

5. The method as recited in claim 4, wherein the instructions comprise signals on a computer readable medium configured to cause a computer on the selected aircraft to adjust a lifetime of the component by the factor.

6. The method as recited in claim 4, further comprising displaying indicia corresponding to the lifetime of the component to a user of the selected helicopter.

7. The method as recited in claim 4, wherein the instructions facilitate adjustment to the lifetime of the component.

8. The method as recited in claim 4, wherein the method is performed on a computer remote from the aircraft.

9. The method as recited in claim 1, wherein the distributions include a plurality of flight loads, the method further including:
multiplying the plurality of flight loads by the factor to provide a flight load adjustment such that the flight load adjustment maintains the same level of structural reliability provided by a conventional component life calculation using "high-envelope" flight loads.

10. The method as recited in claim 1, wherein the distributions include a plurality of flight loads, the method further including:
verifying that the factor achieves a 0.999999 fatigue reliability.

11. The method as recited in claim 1, the method further including:
dividing a retirement damage level for the component by the factor.

12. The method as recited in claim 1, modifying a lifetime of the component for a selected one of the aircraft of the fleet in response to the factor.

13. A method comprising:
accessing distributions of flight loads associated with one or more flight regimes for a fleet of aircraft; and
a computer determining, a factor for at least one of the flight regimes using the distributions of flight loads, wherein the factor provides a flight load adjustment for a component on each aircraft of a fleet of aircraft known to be affected through at least load damage by the at least one flight regime includes:
determining a Weibull plot of an actual distribution of flight loads for one of the flight regimes; and
defining the factor for a selected critical flight regime as a ratio between a 99th percentile Weibull plot flight loads value and a 50th percentile Weibull plot flight loads value for the flight regime.

14. An apparatus comprising a computer configured through computer readable instructions to perform the operations of:
determining a fatigue reliability of an aircraft component in response to at least one of flight usage data, flight load data, historical data, and a fatigue reliability assessment model; and
determining, using distributions of flight loads, a factor for at least one of the flight regimes that provides a flight load adjustment for the component for each aircraft of a fleet known to be affected through at least load damage by the at least one flight regime by performing the steps of:
A) identifying a critical flight regime from the occurrence distribution;
B) determining a 99th percentile flight load value for the critical flight regime in the occurrence distribution;
C) determining a 50th percentile flight load value for the critical flight regime in the occurrence distribution; and
D) defining the factor as a ratio between the 99th percentile and 50th percentile flight load values for the critical flight regime.

15. The apparatus as recited in claim 14, further comprising:
modifying a lifetime of the component for a selected one of the aircraft from the fleet in response to the factor.

16. The apparatus as recited in claim 15, wherein said modifying a lifetime of the component for a selected one of the aircraft from the fleet in response to the factor includes at least one of multiplying a plurality of load damage counts by the factor or dividing a retirement damage level by the factor.

17. A method performed by a computer either on-board or remote from an aircraft, comprising:
receiving a flight loads reliability factor associated with a component on an aircraft;

multiplying aircraft flight loads by the factor to determine adjusted flight loads using the computer;

the computer adjusting, using at least the flight loads reliability factor, a lifetime of the component in response to the adjusted flight loads;

the computer displaying the adjusted lifetime of the component; and wherein said step of the computer adjusting, using at least the flight loads reliability factor, a lifetime of the component in response to the adjusted flight loads comprises the computer defining the flight loads reliability factor as a ratio of between a $99^{th}$ percentile flight loads reliability vale and a $50^{th}$ percentile flight loads reliability value.

18. A method comprising:

accessing distributions of flight loads associated with one or more flight regimes for a fleet of aircraft; and a computer determining a factor for at least one of the flight regimes using the distributions of flight loads, wherein the factor provides a flight load adjustment for a component on each aircraft of a fleet of aircraft known to be affected through at least load damage by the at least one flight regime; and wherein the step of the computer determining a factor for a least one of the flight regions comprises the computer defining the factor as a ratio between a $99^{th}$ percentile flight load value and a $50^{th}$ percentile flight load value.

19. The method of claim 17, wherein said receiving a flight loads reliability factor associated with a component on an aircraft includes receiving a single flight loads reliability factor for a plurality of flight regimes, and said multiplying aircraft flight loads by the flight loads reliability factor to determine adjusted flight loads includes multiplying aircraft flight loads for a plurality of flight regimes by the single flight loads reliability factor.

20. The method of claim 17, wherein said receiving a flight loads reliability factor associated with a component on an aircraft includes receiving a flight loads reliability factor for each of a plurality of flight regimes, and wherein said multiplying aircraft flight loads by the flight loads reliability factor to determine adjusted flight loads includes multiplying each aircraft flight load for a given flight regime by the flight loads reliability factor associated with that flight regime.

* * * * *